Jan. 30, 1940.　　　　G. H. HUNT　　　　2,188,355
MASTER CYLINDER
Filed March 12, 1936
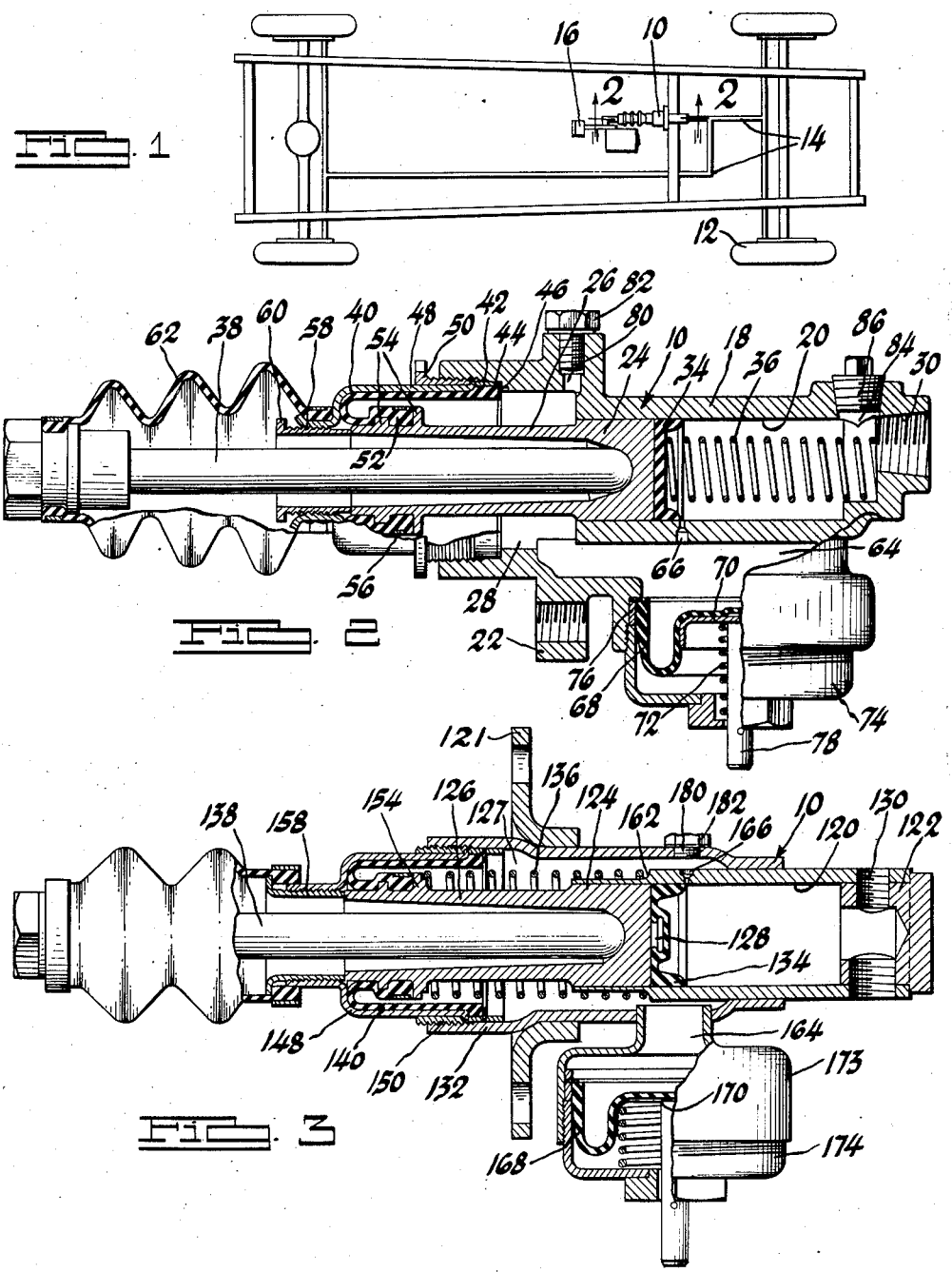
INVENTOR
*George H. Hunt*
BY
ATTORNEY Patented Jan. 30, 1940

2,188,355

UNITED STATES PATENT OFFICE 2,188,355

MASTER CYLINDER

George H. Hunt, Detroit, Mich., assignor, by mesne assignments, to Detroit Hydrostatic Brake Corporation, a corporation of Michigan Application March 12, 1936, Serial No. 68,481

5 Claims. (Cl. 60—54.6)

This application relates to hydraulic braking systems and particularly to improvements in construction of parts thereof, such as the master cylinder.

A principal object of the invention is to provide a new and improved form of master cylinder construction for hydraulic braking systems, and which cylinder construction is particularly adapted for use in hydraulic braking systems of the closed type.

Another object of the invention is to provide an improved form of master cylinder construction which is particularly adapted to be manufactured in quantities and at a reasonable cost, which is more efficient in operation, which is more durable, and which is not subject easily to get out of efficient working condition.

Another object of the invention is to provide in a closed braking system a master cylinder construction having a fluid reservoir associated therewith, with provisions for storing a surplus amount of fluid so as to be available for use when necessary without attention on the part of the operator, the braking system, master cylinder and reservoir all comprising a closed system which is sealed to prevent the loss of fluid therefrom or the entrance of air thereinto.

Other objects and advantages of the invention will appear from a reference to the following specification taken in conjunction with the accompanying drawings of which there is one sheet, and wherein:

Fig. 1 is a more or less diagrammatic view of a braking system applied to the chassis of a vehicle;

Fig. 2 is a view partially in elevation and partially in section of the master cylinder construction and illustrating a preferred form of the invention; and Fig. 3 is a similar view of a somewhat modified form of construction.

In Fig. 1, there is disclosed a diagrammatic view of a chassis of an automotive vehicle illustrating the application thereto of a hydraulic braking system including a master cylinder 10, suitably secured to one of the cross frame members of the chassis, wheels 12 provided with brake structures, fluid supply lines 14 for transmitting pressure from the master cylinder 10 to the wheel brakes 12, and means 16 for operating the master compressor, such as a conventional foot pedal which is adapted to be engaged by the foot of the vehicle operator for operating the master compressor.

The master cylinder 10 may comprise a part of a closed fluid system for operating the individual wheel brakes, and which closed fluid system is so designed and the parts so arranged that the fluid is sealed within the system and not exposed to the atmosphere. In such a closed system, it is possible to have a wider choice of fluid in that a hygroscopic fluid may be used, which type of fluid is not suitable for use in an open hydraulic braking system on account of the absorption of water by such fluid when exposed to atmosphere. In a closed hydraulic braking system, it is possible to use a hygroscopic fluid on account of the fact that the fluid within the system is sealed therein, and it appears to be possible to find a suitable braking fluid of the hygroscopic type having a lower freezing point and a higher boiling point than it is possible to find in fluids of the non-hygroscopic type.

Another advantage of the closed hydraulic braking system is that the fluid is sealed therein and hence there is no loss of fluid due to leakage in the system. For details of wheel brake structure of a closed braking system, reference may be had to my copending application, Ser. No. 68,483, filed March 12, 1936 and issued November 8, 1938 as Patent No. 2,135,666 for "Brake construction". The master cylinder construction illustrated in Fig. 2, comprises a body casting 18 formed internally thereof to provide a cylinder 20, the casting being provided with suitable means, such as a flange 22, whereby the same may be suitably secured to the chassis of an automotive vehicle. Within the cylinder bore 20, an annular piston 24 is adapted to reciprocate, the piston 24 being formed on the head of a sleeve 26 which extends through an enlarged chamber 28 formed in the body casting 18. The cylinder bore 20, at the end thereof away from the retracted position of the piston 24, is provided with an opening 30 by means of which the conduit or fluid line 14 may be connected to the master cylinder 10, so as to transmit the pressure through the fluid contained within such line 14 to the wheel brakes for operating the same. A resilient cup-shaped member 34 is disposed forwardly of the piston 24, and a spring 36 is confined between the cup-shaped member 34 and the end of the cylinder bore 20 for the purpose of maintaining the cup-shaped member 34 in position and also to assist in retracting the piston 24. The cup-shaped member 34 is adapted to seal the piston 24 upon movement thereof and with respect to the cylinder bore 20 so that the fluid within the brake system ahead of the piston 24 may be subjected to pressure.

The piston 24 is adapted to be operated by a rod 38 which seats within the sleeve 26, and which rod is adapted to be operated by any conventional means, such as the foot operated brake pedal 16.

The chamber 28 is closed by a flexible boot 40, constructed of a resilient material, such as rubber, and which boot, at one end thereof, is adapted to be secured to the sleeve 26, and at the other end thereof, is adapted to be secured to the body of the casting 18. At one end thereof, the boot 40 has suitably secured thereto, such as by bonding, a metallic reinforcing ring 42, which is adapted to be secured between a gasket 44 resting upon an annular shoulder 46 provided in the body 18, and the peripheral flange on an annular cup-shaped metallic member 48 which surrounds the boot 40, and which member 48 is secured in place by a nut 50 which is suitably secured in the threaded end of the body casting 18. The opposite end of the boot 40 is secured to the sleeve 26 and is provided with an annular rib 52 which cooperates with a pair of annular flanges 54 formed on the sleeve 26, and which rib 52 may be securely affixed to the flanges 54 by a suitable cement. Thus it will be seen that the chamber 28 is closed by a flexible wall which is sealed at one side to the movable sleeve 26 and, at the other side, to the fixed body casting 18, so that there is no possibility of fluid leakage out of the body casting 18 or the chamber 28 unless the flexible member 40 should become accidentally damaged.

A metallic ring 56 may be secured around the end of the boot secured to the sleeve 26 for reinforcing the connection between the boot 40 and the sleeve 26. Th cup-shaped member 48, at one end thereof, is reduced in cross-section and provided within the reduced section with threads 58 by means of which an adjustable stop member 60 for the sleeve 26 may be secured in position. An extensible boot 62 may, at one end thereof, be secured to the end of the cup-shaped member 48 and to the exposed end of the rod 38 for sealing the space within the boot 62, the member 60 and the sleeve 26 against the entrance of dirt. This extensible boot, however, is not essential.

In connection with the master cylinder, there is provided a compensator chamber 64 which is in free and direct communication with the chamber 28, and which is also provided with a somewhat restricted communication with the cylinder bore 20 ahead of the piston 24 at such time as the piston is in its retracted position, by means of a relatively small opening 66 extending through the wall of the cylinder. As soon as the cup-shaped member 34 of the piston is moved past the opening 66, the space ahead of the cup-shaped member 34 is separated from the chamber 64 as well as from the chamber 28.

The chamber 64 is closed by a flexible wall 68 which is backed up by a spring pressed plunger 70, a spring 72 being secured between the plunger 70 and a cap member 74 which is threadedly secured in a threaded opening provided in the body casting 18. The flexible wall 68 extends completely across the opening in the body member of the casting and is secured in place by the cap member 74 which engages a reinforcing ring 76 to which the flexible wall may be bonded, the connection between the flexible wall and the body casting being such as to insure a seal which will prevent the escape of fluid from the chamber 64. The plunger 70 may be provided with a rod 78 extending through an opening in the cap 74 so as to indicate the position of the plunger within the compensator chamber whereby the quantity of fluid within the brake system may be determined.

When the piston 24 is moved forwardly in the cylinder bore 20 for applying pressure to the fluid therein, the cylinder bore 20 is cut off from communication with the compensator chamber 64 and the chamber 28. During the protractile movement of the piston 24, the volume of the chamber 28 is reduced and fluid therein will be displaced into the compensator chamber 64 and against the force of the spring pressed plunger 70, the spring 72 being a relatively light spring. When the piston 24 is in its retracted position and the system is at rest, the spring pressed plunger 70 operates to maintain the fluid in the system under a slight pressure. The chamber 64, in addition to providing a fluid reservoir, also acts as a compensating chamber to take care of volumetric changes in the fluid of the system due to change in temperature.

As fluid cannot by-pass the piston 24 upon the retractile stroke thereof, the objection known as pedal-pumping cannot be practiced with the compressor construction illustrated herein, and hence when the brake linings of the wheel brake shoes are worn to such an extent as to require adjustment thereof, the brakes cannot be applied by pumping the pedal as is done in hydraulic brake systems of the open type and now on the market. It will be observed that the retracted position of the piston 24 is such as to just clear the opening 66 between the cylinder bore 20 and the expansion chamber 64. The adjustable stop 60 is provided for adjusting the retracted position of the piston 24.

The body casting 18 is provided with an opening 80 in communication with the chamber 28, which opening is closed by a bolt 82, the opening 80 being provided for bleeding air from the system during the initial set-up thereof.

The body casting 18 is provided with another opening 84 in communication with the forward portion of the cylinder bore 20 and normally closed by a threaded plug 86. Within the opening 84, there is adapted to be disposed, when it is desired to use the master cylinder 10 as a pump for pumping fluid through the system, a check valve and a connection to the source of fluid so that fluid may be drawn into the cylinder at such time through the opening 84 and discharged through the opening 30.

Fig. 3 illustrates a modified form of construction wherein the master cylinder 10 comprises an assembly of stampings and tubing which are welded or otherwise suitably secured together to form an integral unit. In the modification illustrated in Fig. 3, the cylinder bore 120 is provided by a tube into one end of which is fixed a plug 122 for closing the end thereof, the plug 122 and the end of the cylinder bore being provided with aligned diametrically disposed openings 130 providing a means whereby the fluid lines 14 of the wheel brakes may be connected to the master cylinder. A piston 124, quite similar in construction to the piston 24 and formed on the end of a sleeve 126, is mounted for reciprocation within the cylinder bore 120 and is provided with a button 128 on the head thereof by means of which a cup 134 may be secured to the piston 124 for movement therewith, and for sealing around the piston 124 and with respect to the bore of the cylinder 120. In this modification, the spring 136 is confined between one of the flanges 154 of the sleeve 126, and a shoulder 162 provided externally of the tube which forms the cylinder bore 120. A boot 140, like the boot 40, is secured at one end thereof to the sleeve 126 and, at the opposite end thereof, to a tubular member 132 by a member 150 threadedly engaging the end of the member 132 and in a manner similar to that by which the boot 40 is secured to the body casting 18. A cup-shaped member 148 is provided for backing up the boot 140 and has secured thereto at one end thereof a nut 158 providing an adjustable stop for the sleeve 126 of piston 124, a rod 138 extending through the nut 158 and being seated within the sleeve 126 and being adapted for operating the piston 124. The cylinder bore is in communication with the chamber 127, formed within the member 132, by an opening 166 provided in the wall of the cylinder bore 120 ahead of the retracted position of the piston 124.

A compensator chamber 164, similar in function and location to the chamber 64, is in communication with the chamber 127 and comprises a pair of stampings 173 and 174 threadedly secured together and housing a spring pressed plunger 170 which backs up a flexible wall 168 extending across the chamber 164 and sealing the fluid therein from the atmosphere, the flexible wall 168 being secured to the wall of the compensator chamber in a manner similar to that in which the flexible wall 168 is secured. The stamping 173 is provided with a reduced neck portion by means of which it is secured within an opening provided in the member 132. The member 132 may have secured thereto a plate 121 by means of which the master cylinder may be suitably secured to the chassis of an automotive vehicle. The member 132 is provided with a threaded opening 180 normally closed by a bolt 182 by means of which opening 180 the air may be bled from the system, and also at which opening 180 a check valve may be connected as described in connection with the opening 84 for pumping the fluid system, using the master cylinder as a pump, and providing a source of fluid to be fed through the opening 180 past the check valve therein.

While the invention has been described with some detail, it is to be understood that the description is for the purpose of illustration only and is not definitive of the limits of the inventive idea. The right is reserved to make such changes in the details of construction and arrangement of parts as will fall within the purview of the attached claims.

I claim:

1. Master cylinder construction comprising a body member provided with a cylinder bore internally thereof, a piston mounted for reciprocation within said bore, a resilient cup-shaped member operatively associated with the forward face of said piston adapted for sealing the same with respect to said bore, a fluid chamber externally of said cylinder bore and having an opening, a flexible wall directly connected at one end to said body member inwardly of said opening and at the other end directly to the rear of said piston for sealing said chamber against loss of fluid therefrom, a rigid metallic wall enclosing said flexible wall and connected to said body member inwardly of said opening, said metallic wall being free of said piston, and an opening in said cylinder bore affording communication between the same and said chamber when said piston is in its retracted position.

2. Master cylinder construction comprising a body member provided with a cylinder bore internally thereof, a piston mounted for reciprocation within said bore, a resilient cup-shaped member operatively associated with the forward face of said piston and adapted for sealing the same with respect to said bore, a fluid chamber externally of said cylinder bore, a flexible wall sealed to said body member and to said piston for sealing said chamber against loss of fluid therefrom, an opening to said cylinder bore affording communication between the same and said chamber when said piston is in its retracted position, and a hollow adjustable stop member surrounding said actuating member externally of said wall for limiting the retractile movement of said piston.

3. Master cylinder construction comprising a body member provided internally thereof with a cylinder bore, a piston reciprocable in said cylinder, a chamber externally of said cylinder bore and in communication with said piston at the rear thereof, means affording communication between said cylinder bore and said chamber when said piston is in its retracted position, a flexible wall sealed at one end thereof to said body member, and at the other end thereof, to said piston externally of said cylinder bore for sealing said chamber against loss of fluid therefrom, a metallic wall disposed externally of said flexible wall and secured to said body member, and an adjustable stop for said piston carried by said metallic wall.

4. In a hydraulic braking system, a body member having an open end and formed internally thereof to provide a chamber and a cylinder bore, a piston mounted for reciprocation within said cylinder, a flexible wall sealed at one end to an inner wall of said chamber substantially beyond the open end of said body member and at the other end to the rear of said piston, said first end of said wall being thereby housed within said chamber and said wall extending across said open end for closing said chamber, an opening affording communication between said chamber and said cylinder bore when said piston is in its retracted position, and an expansion chamber in free communication with said first mentioned chamber.

5. In a hydraulic braking system, a body member having an open end, a piston actuating means extending through said open end, a flexible wall, said body member being formed internally thereof to provide a chamber and a cylinder bore communicating therewith, a piston mounted for reciprocation within said bore and having a retracted position adjacent the end thereof terminating in said chamber, said piston being adapted to be actuated by said piston actuating means, one end of said flexible wall being directly connected to the rear of said piston and the other end of said wall being directly connected to an inner portion of said body member inwardly of said open end whereby to seal in said chamber and house therewithin said inner end of said wall, a sealing member operatively associated with the forward face of said piston and adapted for sealing the same with respect to said bore upon movement of said piston, and means affording communication between said bore and said chamber when said piston is in its retracted position.

GEORGE H. HUNT.